United States Patent
Shiraishi et al.

(10) Patent No.: US 10,604,180 B2
(45) Date of Patent: Mar. 31, 2020

(54) VEHICLE TRAVELING CONTROL SYSTEM

(71) Applicant: SUBARU CORPORATION, Tokyo (JP)

(72) Inventors: Eiichi Shiraishi, Tokyo (JP); Takayuki Nagase, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 10 days.

(21) Appl. No.: 15/968,157

(22) Filed: May 1, 2018

(65) Prior Publication Data

US 2019/0031236 A1    Jan. 31, 2019

(30) Foreign Application Priority Data

Jul. 31, 2017  (JP) ................................. 2017-148051

(51) Int. Cl.
    *B62D 6/04*    (2006.01)
    *B62D 15/02*   (2006.01)
    B62D 5/04     (2006.01)

(52) U.S. Cl.
    CPC ............. *B62D 6/04* (2013.01); *B62D 15/025* (2013.01); *B62D 5/0463* (2013.01)

(58) Field of Classification Search
    CPC ...... B62D 6/04; B62D 15/025; B62D 5/0463; B62D 6/001
    USPC ......................................................... 701/41
    See application file for complete search history.

(56) References Cited

FOREIGN PATENT DOCUMENTS

| JP | 2002-264832 A | * | 9/2002 |
| JP | 2007-106364 A | * | 4/2007 |
| JP | 2011-105105 A |   | 6/2011 |
| JP | 2011-136588 A |   | 7/2011 |

OTHER PUBLICATIONS

Japanese Office Action issued in corresponding Japanese Patent Application No. 2017-148051, dated Jan. 15, 2019, with English Translation.
Japanese Notice of Reasons for Refusal issued in corresponding Japanese Patent Application No. 2017-14805, dated Jun. 11, 2019, with English translation.

* cited by examiner

*Primary Examiner* — Brian P Sweeney
(74) *Attorney, Agent, or Firm* — McDermott Will & Emery LLP

(57) ABSTRACT

A vehicle traveling control system includes: an electric power steering device, a positioning device, a communication device, and a control unit. The communication device receives wind information including information on a wind direction and a detection position of crosswind detected on a course of a host vehicle. The crosswind blows from a side with respect to the host vehicle. The control unit changes an assist force generation map of the electric power steering device such that an assist force that the electric power steering device generates with respect to steering performed up the crosswind becomes stronger than an assist force that the electric power steering device generates with respect to steering performed down the crosswind during traveling of the host vehicle through the detection position of the crosswind.

1 Claim, 10 Drawing Sheets

VEHICLE TRAVELING CONTROL SYSTEM

CROSS-REFERENCE TO RELATED APPLICATIONS

The present application claims priority from Japanese Patent Application No. 2017-148051 filed on Jul. 31, 2017, the entire contents of which are hereby incorporated by reference.

BACKGROUND

1. Technical Field

The present invention relates to a vehicle traveling control system provided with an electric power steering device.

2. Related Art

Crosswind is a type of disturbance disturbing courses of vehicles such as automobiles. Japanese Unexamined Patent Application Publication (JP-A) No. 2007-106364 discloses a technique for suppressing shaking of a host vehicle by acquiring crosswind information by communication and enhancing the roll stiffness of the host vehicle before the host vehicle travels through a point where the host vehicle is predicted to be affected by crosswind.

SUMMARY OF THE INVENTION

An aspect of the present invention provides a vehicle traveling control system including an electric power steering device, a positioning device, a communication device, and a control unit. The communication device is configured to receive wind information including information on a wind direction and a detection position of crosswind detected on a course of a host vehicle. The crosswind blows from a side with respect to the host vehicle. The control unit is configured to change an assist force generation map of the electric power steering device such that an assist force that the electric power steering device generates with respect to steering performed up the crosswind becomes stronger than an assist force that the electric power steering device generates with respect to steering performed down the crosswind during traveling of the host vehicle through the detection position of the crosswind.

DETAILED DESCRIPTION

Figure 1:
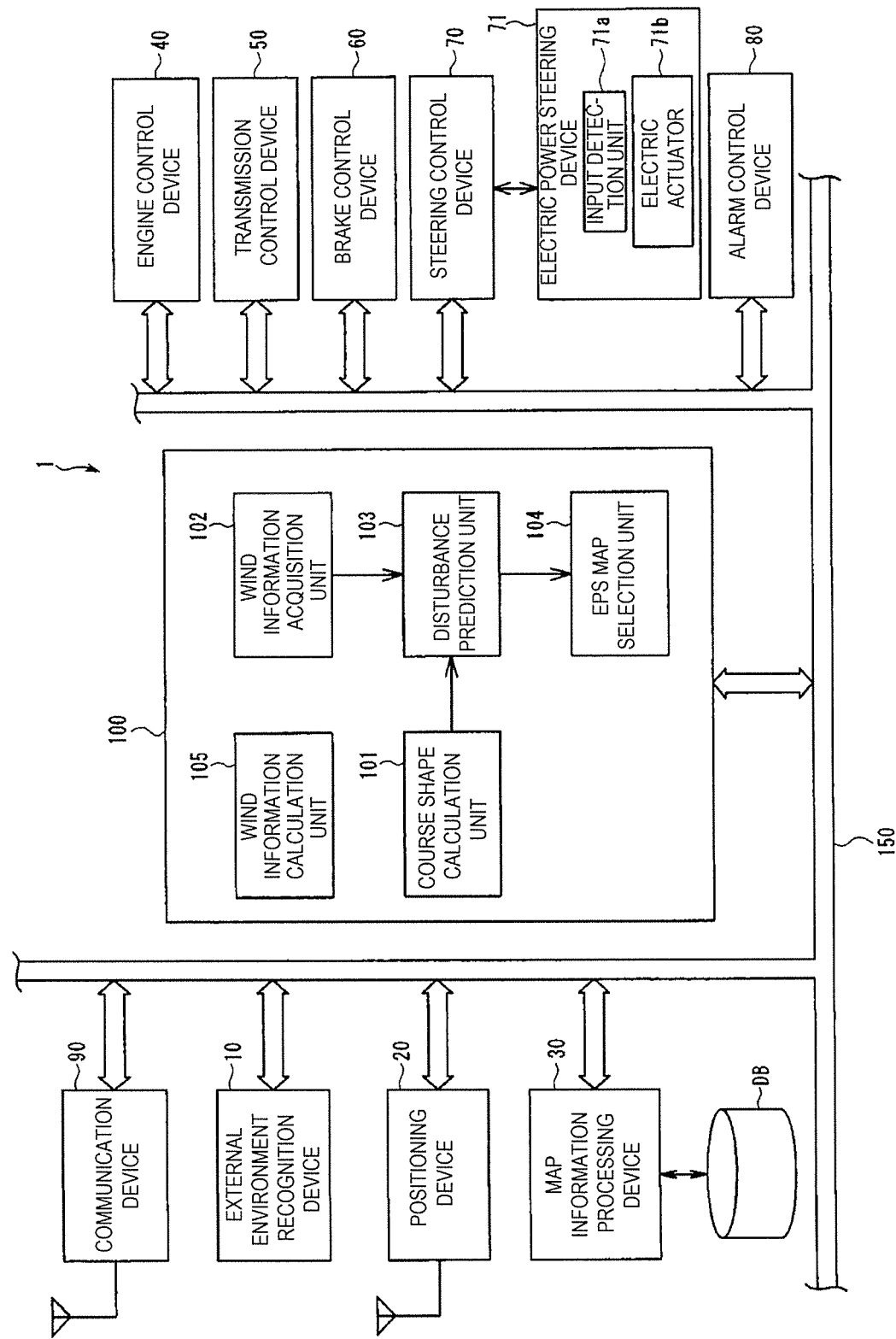
FIG. 1 is a configuration diagram of a traveling control system.

Hereinafter, a preferred example of the present invention will be described with reference to accompanying drawings. Note that the following description is directed to an illustrative example of the disclosure and not to be construed as limiting to the present invention. Factors including, without limitation, numerical values, shapes, materials, components, positions of the components, and how the components are coupled to each other are illustrative only and not to be construed as limiting to the present invention. Further, elements in the following example implementations which are not recited in a most-generic independent claim of the disclosure are optional and may be provided on an as-needed basis. The components in the drawings used for the following description have different scales so that the components have sizes recognizable on the drawings. The present invention is not limited to the quantities of the components, the shapes of the components, the size ratios of the components, and the relative positional relationships of the components shown in the drawings.

The relationship between an steering angle and a traveling direction of a host vehicle deviates, due to the force that crosswind applies to the host vehicle, even in a case where the roll stiffness of the host vehicle is enhanced at a point where the crosswind is received. Accordingly, a driver should perform steering for correcting the deviation. Therefore, a reduction in steering force for maintaining the course of the host vehicle against the crosswind is desirable for a reduction in the fatigue of the driver subjected to the crosswind.

It is desirable to provide a vehicle traveling control system with which the fatigue of a driver subjected to crosswind can be reduced.

Sign 1 in FIG. 1 indicates a traveling control system for a vehicle such as an automobile, and the traveling control system executes vehicle traveling control including autonomous self-driving. This traveling control system 1, which is centered around a traveling control device 100, is configured by an external environment recognition device 10, a positioning device 20, a map information processing device 30, an engine control device 40, a transmission control device 50, a brake control device 60, a steering control device 70, an alarm control device 80, a communication device 90, and so on being interconnected via a communication bus 150 forming an in-vehicle network.

The vehicle is provided with a state quantity detection device (not illustrated) detecting state quantities. The state quantity detection device includes at least a vehicle speed sensor, an acceleration sensor, a yaw rate sensor, and a steering angle sensor. These sensors, which are known techniques, will not be described in detail here.

The external environment recognition device 10 recognizes the external environment around the host vehicle from, for instance, information on objects around the host vehicle detected by various devices such as a camera, a millimeter-wave radar, and a laser radar, position information on the host vehicle positioned by the positioning device 20, and map information from the map information processing device 30.

The positioning device 20 detects the current position (latitude and longitude) of the vehicle by using at least one of a satellite positioning system (GNSS), an inertial navigation device, or road-to-vehicle communication.

The map information processing device 30 is provided with a map information memory unit DB storing map information. The map information includes road shape information such as road coordinates (latitudes, longitudes, and elevations), the azimuth angles of roads, road curvatures, the longitudinal slopes of roads, and intersection between roads.

The engine control device 40 controls engine (not illustrated) operation states based on signals from various sensors detecting the engine operation states and various types of control information transmitted via the communication bus 150. The engine control device 40 executes engine control mainly including fuel injection control, ignition timing control, opening degree control for an electronically controlled throttle valve, and so on based on, for instance, vehicle information such as an intake air amount, a throttle opening degree, an engine coolant temperature, an intake air temperature, an air-fuel ratio, a crank angle, and an accelerator opening degree.

The transmission control device 50 controls the hydraulic pressure that is supplied to an automatic transmission (not illustrated) based on signals from various sensors detecting a shift position, the vehicle speed, and so on and various types of control information transmitted via the communication bus 150 and controls the automatic transmission in accordance with transmission characteristics set in advance.

The brake control device 60 controls the brake devices (not illustrated) of four wheels independently of a driver's brake operation based on, for instance, vehicle information such as brake switch, four-wheel speed, steering wheel angle, and yaw rate. In addition, the brake control device 60 calculates the brake hydraulic pressure for each wheel based on the braking force of each wheel and performs antilock brake system and sideslip prevention control and so on.

The steering control device 70 controls an electric power steering device 71 changing the steering angle of the vehicle with electric actuator output. The electric power steering device (EPS) 71, which is a known technique, will not be described in detail here. Schematically, the electric power steering device 71 is provided with an input detection unit 71a detecting the steering force (steering torque) that is applied to the steering wheel by the driver and an electric actuator 71b generating a force changing the steering angle of the vehicle.

The steering control device 70 generates an assist force (assist torque) Ta retaining the steering force by means of the electric actuator 71b and in response to a steering force Td detected by the input detection unit 71a. The steering control device 70 controls the electric actuator 71b based on an assist force generation map defining the relationship between the steering force Td and the assist force Ta.

Figure 2:
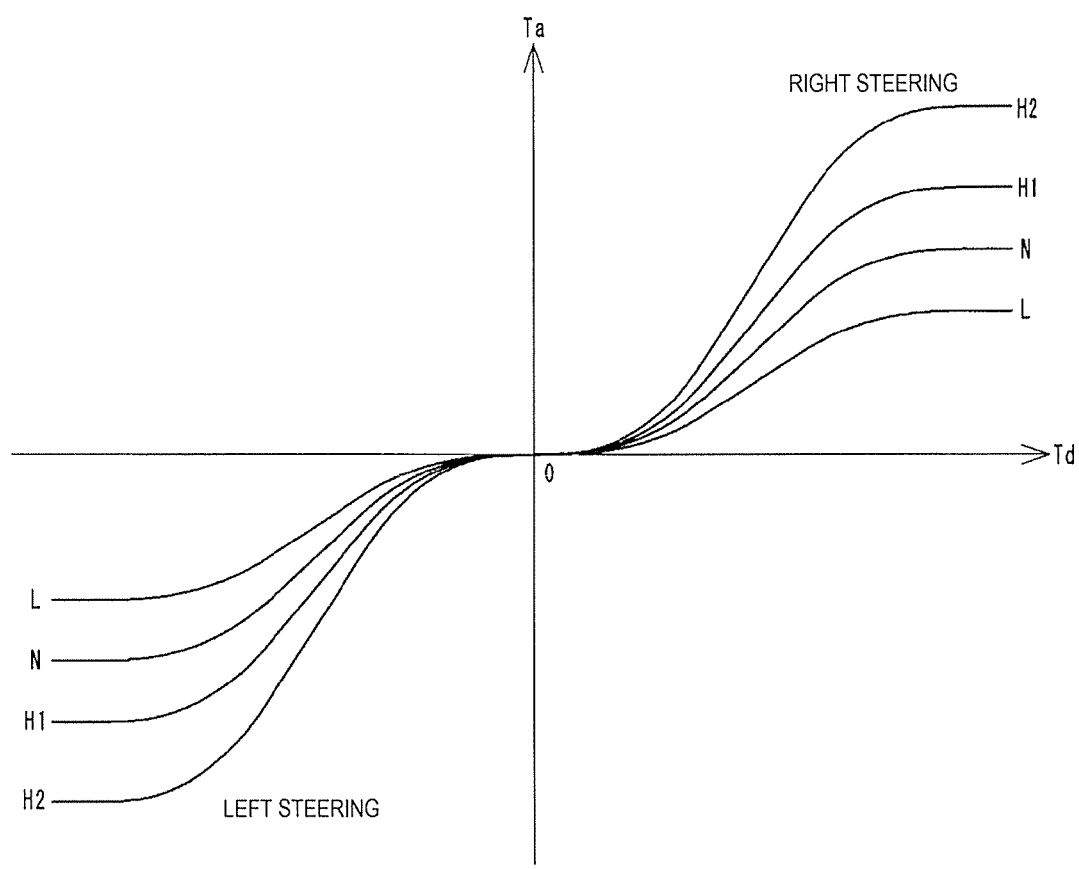
FIG. 2 is a diagram illustrating an example of an assist force generation map of an electric power steering device.

An example of the assist force generation map is illustrated in FIG. 2. In FIG. 2, the horizontal axis represents the steering force Td applied to the steering wheel by the driver and the vertical axis represents the assist force Ta generated in the electric actuator 71b.

In FIG. 2, a case where the steering force Td and the assist force Ta are positive values is indicated as a case of right steering, which is steering for changing the traveling direction of the vehicle to the right, and a case where the steering force Td and the assist force Ta are negative values is indicated as a case of left steering, which is steering for changing the traveling direction of the vehicle to the left. When it comes to a general vehicle in which a driver performs steering via a steering wheel, a case where the steering wheel is turned clockwise from the driver's viewpoint is the right steering and a case where the steering wheel is turned counterclockwise from the driver's viewpoint is the left steering.

In the present example, the assist force generation map is variable (described in detail later). In addition, assist force generation maps that have different characteristics can be selected for right and left steering. An EPS map selection unit 104 decides on an assist force generation map.

In the present example, the assist force generation map can be changed into at least four characteristics, that is, normal assist map (curve N), low assist map (curve L), medium assist map (curve H1), and high assist map (curve H2) in FIG. 2.

When it comes to these four assist force generation maps, the assist force Ta generated with respect to the same steering force Ta is highest in the high assist map H2, second-highest in the medium assist map H1, third-highest in the normal assist map N, and lowest in the low assist map L.

The alarm control device 80 is a device generating an alarm in a case where various devices of the vehicle are abnormal. For instance, the alarm control device 80 performs warning and notification by using at least one of the visual output of a monitor, a display, an alarm lamp, and the like or the acoustic output of a speaker/buzzer, and the like.

A wireless communication device that has a predetermined communication area constitutes the communication device 90, and the communication device 90 transmits and receives information to and from a communication device outside the host vehicle. The communication device 90 may perform so-called vehicle-to-vehicle communication, that is, direct communication with a non-host vehicle in the communication area of the host vehicle. In addition, the communication device 90 may transmit and receive information to and from a server by communication with a radio base station in the communication area of the host vehicle.

Although the information transmitted and received by the communication device 90 is not particularly limited, the information transmitted and received by the communication device 90 includes wind information (described below) in the present example.

The wind information includes information on the wind speed and azimuth angle (wind direction) of the wind detected on or near a road, position information on the point where the wind direction and wind speed are detected, and information on the time when the wind direction and wind speed are detected. Here, the information on the azimuth angle of the wind will be referred to as wind direction information, the information on the wind speed will be referred to as wind speed information, and the position information on the point where the wind direction information and the wind speed information are acquired will be referred to as wind detection position information with regard to the wind information. The wind detection position information includes at least latitude and longitude information.

In a case where the wind information is received from a non-host vehicle, the non-host vehicle has a wind information calculation unit calculating the wind information. Means by which a vehicle calculates the wind information during traveling is not particularly limited.

For instance, the wind information calculation unit may calculate the wind direction and the wind speed at a point where the host vehicle travels by comparison between an airspeed vector measured by a sensor of the vehicle and a ground speed vector obtained from the traveling azimuth angle and vehicle speed of the vehicle.

In addition, for instance, the wind information calculation unit may calculate the wind direction and the wind speed at a point where the host vehicle travels by recognizing the state of a streamer in the vicinity of a road with the camera of the external environment recognition device.

In addition, the wind information calculation unit may calculate the wind direction and the wind speed at a point where the host vehicle travels by detecting disturbance resulting from the wind applied during the automatic steering control of the host vehicle in a predetermined present-to-past period and based on the result of the disturbance detection.

In a case where the wind information is received from a server, the wind information is calculated by an anemometer installed on or near a road.

As an example, in the present example, the traveling control device 100 is provided with a wind information calculation unit 105. Accordingly, the traveling control device 100 is capable of transmitting the wind information detected during host vehicle traveling to a server and a non-host vehicle outside via the communication device 90.

The traveling control device 100 centered around the traveling control system 1 will be described below. The traveling control device 100 is configured to be provided with a computer in which a CPU, a ROM, an input and output device, and so on are connected to a bus. Alternatively, the traveling control device 100 may be configured by means of combination of a plurality of computers.

The traveling control device 100 executes traveling control via the engine control device 40, the transmission control device 50, the brake control device 60, and the steering control device 70 based on driver operation and road shape information calculated from the external environment recognition device 10, the positioning device 20, and the map information processing device 30.

The traveling control device 100 is provided with a course shape calculation unit 101, a wind information acquisition unit 102, a disturbance prediction unit 103, and the EPS map selection unit 104 as functional units controlling the electric power steering device 71. These configurations of the traveling control device 100 may be mounted as separate pieces of hardware executing individual functions or may be mounted as software such that individual functions are achieved by a predetermined program being executed by the CPU. In addition, these configurations of the traveling control device 100 may be incorporated into the steering control device 70.

The course shape calculation unit 101 calculates the road shape information, which is information on the shape of the host vehicle traveling road that is ahead in the traveling direction, based on information output from the positioning device 20 and the map information processing device 30. The road shape information calculated by the course shape calculation unit 101 is information on the shape of the road on which the host vehicle is predicted to travel for a predetermined time Δt (sec) starting from the present. The road shape information calculated by the course shape calculation unit 101 includes at least the coordinates (latitude and longitude) of the lane center line, the curvature, and the azimuth angle of the road. Here, the curvature includes information on whether the road curves to the right or left. The road shape information may also include the longitudinal and transverse gradients of the road.

The wind information acquisition unit 102 receives the wind information received via the communication device 90. The disturbance prediction unit 103 calculates, based on the road shape information and the wind information, the strength and direction of a force (disturbance) that the host vehicle receives from wind on a future traveling course of the host vehicle.

More specifically, the disturbance prediction unit 103 extracts the wind information detected on the future course of the host vehicle by comparison between the coordinates of the road on which the host vehicle is predicted to travel for the predetermined time Δt (sec) starting from the present and the position coordinates of the wind information. Then, based on the wind information and the traveling azimuth angle of the host vehicle at the point where the wind information is detected, the disturbance prediction unit 103 stores, as a crosswind point, a point where a force with a predetermined strength or more is predicted to be applied to the host vehicle in the vehicle width direction (lateral direction) by the wind.

The EPS map selection unit 104 decides on an assist force generation map shape for deciding on an assist force generated in the electric actuator 71b of the electric power steering device 71. In other words, the EPS map selection unit 104 defines the characteristics of the assist force generation by the electric power steering device 71.

Figure 3:
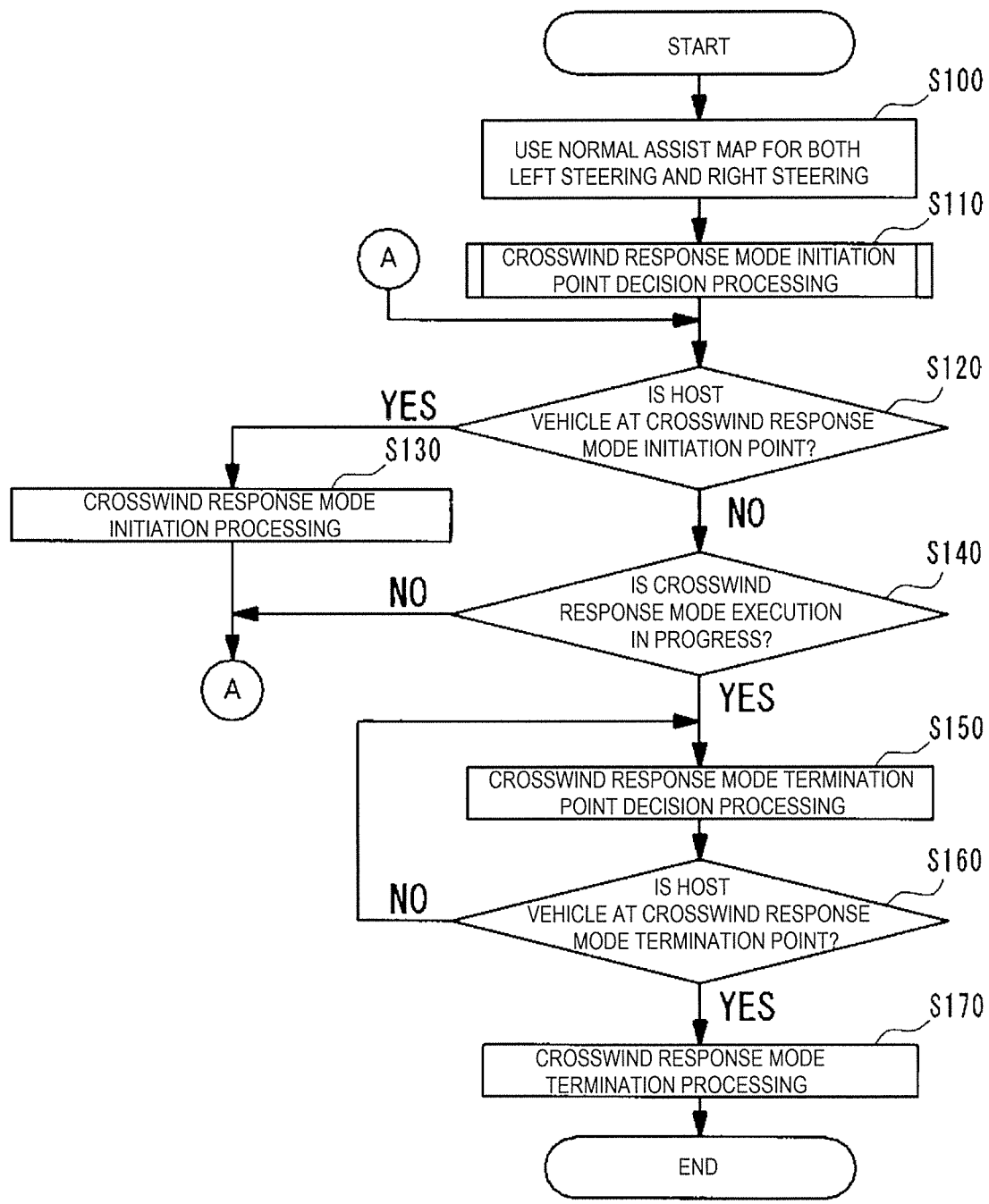
FIG. 3 is a flowchart of map selection processing executed by an EPS map selection unit.

FIG. 3 is a flowchart of the map selection processing that is executed by the EPS map selection unit 104. The map selection processing that is illustrated in FIG. 3 is repeatedly executed at a predetermined cycle in a case where the driver performs manual host vehicle driving.

Schematically, the assist force generation map that is selected by the EPS map selection unit 104 in a case where the host vehicle travels near the crosswind point differs in shape from the assist force generation map that is selected by the EPS map selection unit 104 in the other case.

In the following description, the control operation for the electric power steering device 71 in a case where the host vehicle travels near the crosswind point that is performed by the EPS map selection unit 104 in a case where the host vehicle travels near the crosswind point will be referred to as a crosswind response mode. In addition, the control operation for the electric power steering device 71 that is performed by the EPS map selection unit 104 during crosswind response mode non-execution will be referred to as a normal traveling mode.

In the map selection processing, the EPS map selection unit 104 first selects, in Step S100, the normal assist map N as the normal traveling mode regardless of the left steering and the right steering. In the normal traveling mode, the normal assist map N of the same shape is selected for both the left steering and the right steering, and thus the electric power steering device 71 generates, regardless of the left steering and the right steering, the same assist force Ta with respect to a certain steering force Td although the signs are different.

Figure 4:
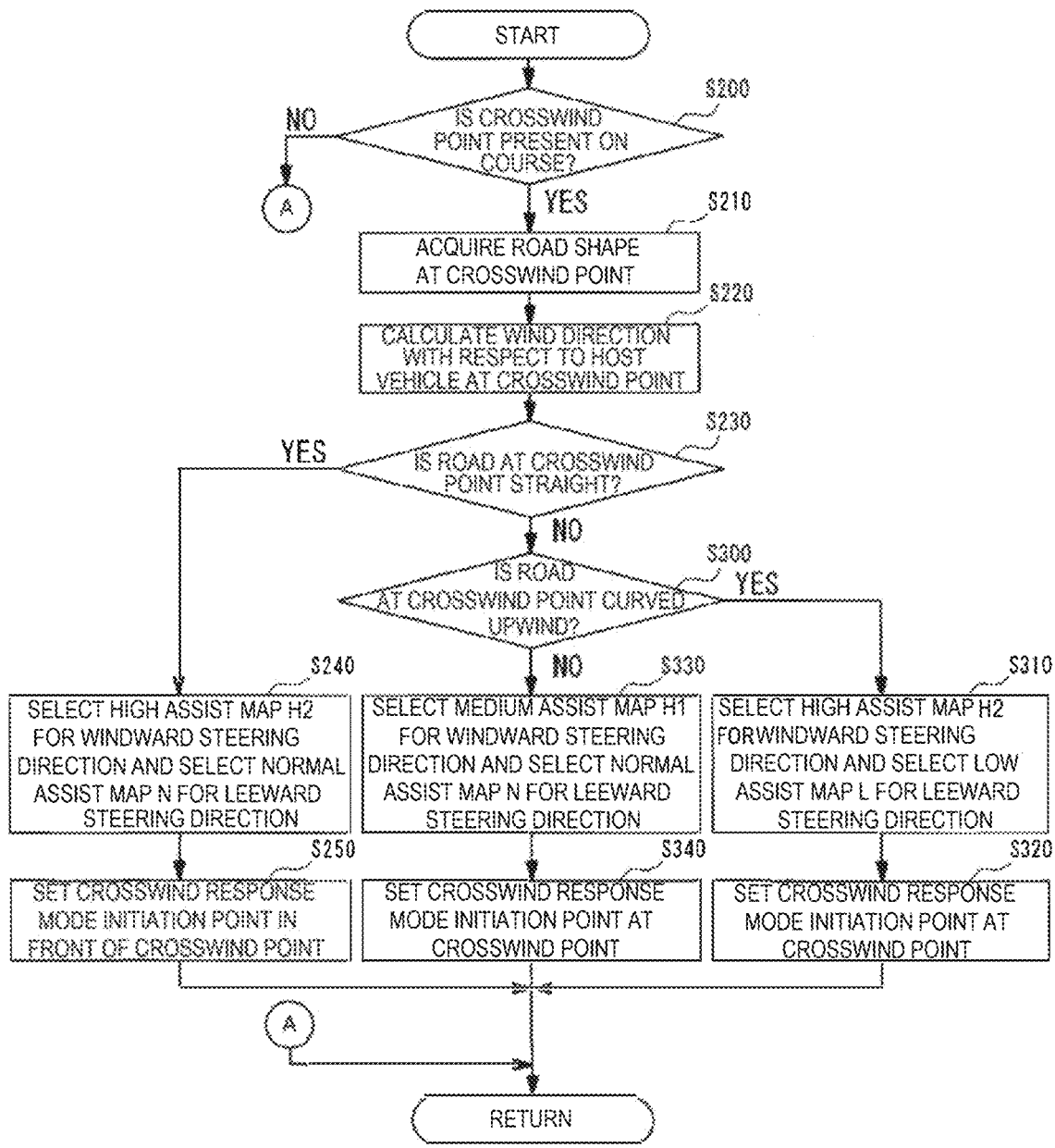
FIG. 4 is a flowchart of crosswind response mode initiation point decision processing.

Next, in Step S110, the EPS map selection unit 104 executes the crosswind response mode initiation point decision processing in the flowchart that is illustrated in FIG. 4. The crosswind response mode initiation point decision processing is processing for deciding on a point where the operation of the EPS map selection unit 104 changes from the normal traveling mode to the crosswind response mode and the operation content of the crosswind response mode.

The crosswind response mode initiation point decision processing will be described with reference to FIG. 4.

In the crosswind response mode initiation point decision processing, the EPS map selection unit 104 first determines, in Step S200, whether the crosswind point is present on the host vehicle course for the predetermined time Δt (sec) starting from the present. In a case where the crosswind point is not stored by the disturbance prediction unit 103 in Step S200 and the EPS map selection unit 104 determines that no crosswind point is present on the host vehicle course for the predetermined time starting from the present, the EPS map selection unit 104 terminates the crosswind response mode initiation point decision processing and returns to the flowchart illustrated in FIG. 3.

Although the determination in Step S200 according to the present example is a determination on whether the crosswind point is present on the host vehicle course for the predetermined time Δt (sec) starting from the present, the determination in Step S200 may also be a determination on whether the crosswind point is present within a predetermined distance on the host vehicle course.

The EPS map selection unit 104 proceeds to Step S210 in a case where the EPS map selection unit 104 determines in Step S200 that the crosswind point is present on the host vehicle course for the predetermined time starting from the present.

In Step S210, the EPS map selection unit 104 acquires the road shape at the crosswind point based on the road shape information. Specifically, the road shape at the crosswind point includes the azimuth angle of the road, the curvature of the road, and information on whether the road curves to the right or left.

Next, in Step S220, the EPS map selection unit 104 calculates the relative wind direction with respect to the host vehicle at the crosswind point based on the road shape information and the wind information. The relative wind direction with respect to the host vehicle includes at least information on whether the wind direction at the crosswind point is a left-to-right direction or a right-to-left direction with respect to the host vehicle.

The right and left of the host vehicle mean the right and left in the traveling direction of the host vehicle. In other words, in a case where the host vehicle travels to the north, the east is the right of the host vehicle and the west is the left of the host vehicle.

Next, in Step S230, the EPS map selection unit 104 determines, based on the road shape information, whether the road at the crosswind point is straight. In Step S230, the EPS map selection unit 104 determines that the road at the crosswind point is straight in a case where the curvature of the road at the crosswind point is equal to or less than a predetermined value. In other words, the EPS map selection unit 104 determines that the road at the crosswind point is straight when the curvature radius of the road at the crosswind point is equal to or greater than a predetermined value.

The EPS map selection unit 104 proceeds to Step S240 in a case where the EPS map selection unit 104 determines in Step S230 that the road at the crosswind point is straight.

In Step S240, the EPS map selection unit 104 selects the high assist map H2 with regard to the steering direction in which the traveling direction is changed to the windward direction at the crosswind point and selects the normal assist map N with regard to the steering direction in which the traveling direction is changed to the leeward direction at the crosswind point.

In other words, in Step S240, the EPS map selection unit 104 allows the assist force Ta generated in the electric power steering device 71 to be stronger than in the normal traveling mode in a case where steering is performed in the direction opposite to the direction of the force applied to the host vehicle by the wind and selects the assist force generation map such that the assist force Ta is the same as in the normal traveling mode in a case where steering is performed in the same direction as the direction of the force applied to the host vehicle by the wind.

At the point in time when Step S240 is executed, the assist force generation map selected by the EPS map selection unit 104 is not reflected in the operation control for the electric power steering device 71.

Next, in Step S250, the EPS map selection unit 104 sets, as a crosswind response mode initiation point, a point at a predetermined distance from the crosswind point toward the host vehicle along the host vehicle course. In other words, in a case where the road at the crosswind point is straight, the crosswind response mode initiation point is in front of the crosswind point.

The distance between the crosswind point and the crosswind response mode initiation point is not particularly limited and may be a fixed value or a variable value. As an example, in the present example, the EPS map selection unit 104 calculates the distance between the crosswind point and the crosswind response mode initiation point based on the vehicle speed of the host vehicle, response delay with respect to host vehicle steering, and the strength of the force that the host vehicle is assumed to receive from the wind from the crosswind. Response characteristics with respect to host vehicle steering are determined by, for instance, the time constant of the electric actuator 71b, the rigidity and play of a steering device of the host vehicle, and tire and body rigidity.

For instance, the EPS map selection unit 104 increases the distance between the crosswind point and the crosswind response mode initiation point as the strength of the force that the host vehicle is assumed to receive from the wind from the crosswind increases. In addition, for instance, the EPS map selection unit 104 increases the distance between the crosswind point and the crosswind response mode initiation point as the response delay with respect to host vehicle steering increases. In addition, for instance, the EPS map selection unit 104 increases the distance between the crosswind point and the crosswind response mode initiation point as the vehicle speed of the host vehicle increases.

After Step S250 is executed, the EPS map selection unit 104 returns to the flowchart illustrated in FIG. 3.

The EPS map selection unit 104 proceeds to Step S300 in a case where the EPS map selection unit 104 determines in Step S230 that the road at the crosswind point is not straight. In other words, the EPS map selection unit 104 proceeds to Step S300 in a case where the EPS map selection unit 104 determines that the road at the crosswind point is curved.

In Step S300, the EPS map selection unit 104 determines whether the road at the crosswind point curves in the windward direction.

The EPS map selection unit 104 proceeds to Step S310 in a case where the EPS map selection unit 104 determines in Step S300 that the road at the crosswind point curves in the windward direction. In other words, the EPS map selection unit 104 proceeds to Step S310 in a case where the direction in which the road curves is opposite to the direction of the force applied to the host vehicle by the wind at the crosswind point.

In Step S310, the EPS map selection unit 104 selects the high assist map H2 with regard to the steering direction in which the traveling direction is changed to the windward direction at the crosswind point and selects the low assist map L with regard to the steering direction in which the traveling direction is changed to the leeward direction at the crosswind point.

In other words, in Step S310, the EPS map selection unit 104 allows the assist force Ta generated in the electric power steering device 71 to be stronger than in the normal traveling mode in a case where steering is performed in the direction opposite to the direction of the force applied to the host vehicle by the wind and selects the assist force generation map such that the assist force Ta is weaker than in the normal traveling mode in a case where steering is performed in the same direction as the direction of the force applied to the host vehicle by the wind.

At the point in time when Step S310 is executed, the assist force generation map selected by the EPS map selection unit 104 is not reflected in the operation control for the electric power steering device 71.

Next, in Step S320, the EPS map selection unit 104 sets the crosswind point as the crosswind response mode initiation point. After Step S320 is executed, the EPS map selection unit 104 returns to the flowchart illustrated in FIG. 3.

The EPS map selection unit 104 proceeds to Step S330 in a case where the EPS map selection unit 104 determines in Step S300 that the road at the crosswind point does not curve in the windward direction. In other words, the EPS map selection unit 104 proceeds to Step S330 in a case where the direction in which the road curves corresponds to the direction of the force applied to the host vehicle by the wind at the crosswind point.

In Step S330, the EPS map selection unit 104 selects the medium assist map H1 with regard to the steering direction in which the traveling direction is changed to the windward direction at the crosswind point and selects the normal assist map N with regard to the steering direction in which the traveling direction is changed to the leeward direction at the crosswind point.

In other words, in Step S330, the EPS map selection unit 104 allows the assist force Ta generated in the electric power steering device 71 to be slightly stronger than in the normal traveling mode in a case where steering is performed in the direction opposite to the direction of the force applied to the host vehicle by the wind and selects the assist force generation map such that the assist force Ta is the same as in the normal traveling mode in a case where steering is performed in the same direction as the direction of the force applied to the host vehicle by the wind.

At the point in time when Step S330 is executed, the assist force generation map selected by the EPS map selection unit 104 is not reflected in the operation control for the electric power steering device 71.

Next, in Step S340, the EPS map selection unit 104 sets the crosswind point as the crosswind response mode initiation point. After Step S340 is executed, the EPS map selection unit 104 returns to the flowchart illustrated in FIG. 3.

As described above, in the crosswind response mode initiation point decision processing, the EPS map selection unit 104 decides on a crosswind response mode initiation point and an assist force generation map selected in the crosswind response mode.

Referring back to the flowchart illustrated in FIG. 3, the EPS map selection unit 104 determines in Step S120 whether the host vehicle is at the crosswind response mode initiation point. In Step S120, the EPS map selection unit 104 determines that the host vehicle is at the crosswind response mode initiation point in a case where the host vehicle is positioned within a predetermined distance from the crosswind response mode initiation point.

The crosswind response mode initiation point is in front of the crosswind point by a predetermined distance in a case where the road at the crosswind point is straight as described above. The crosswind response mode initiation point is the crosswind point in a case where the road at the crosswind point is curved.

The EPS map selection unit 104 proceeds to Step S130 in a case where the EPS map selection unit 104 determines in Step S120 that the host vehicle is at the crosswind response mode initiation point. In Step S130, the EPS map selection unit 104 executes crosswind response mode initiation processing to initiate the crosswind response mode.

In the crosswind response mode initiation processing, the EPS map selection unit 104 changes the shape of the assist force generation map for deciding on an assist force generated in the electric actuator 71b of the electric power steering device 71 to that selected in Step S110. Here, the EPS map selection unit 104 changes the shape of the assist force generation map gradually and in a plurality of divided stages such that the shape of the assist force generation map is smoothly changed.

For instance, in a case where the shape of the assist force generation map is changed from the normal assist map N to the high assist map H2 by the crosswind response mode being initiated in Step S130, the assist force generated in the electric power steering device 71 with respect to a certain steering force value is gradually strengthened along a clothoid curve with time.

By the shape of the assist force generation map being smoothly changed as described above, discomfort given to the driver as a result of a change in the shape of the assist force generation map can be suppressed or prevented.

After Step S130 is executed, the EPS map selection unit 104 returns to Step S120.

The EPS map selection unit 104 proceeds to Step S140 in a case where the EPS map selection unit 104 determines in Step S120 that the host vehicle is not at the crosswind response mode initiation point. The case where the EPS map selection unit 104 determines that the host vehicle is not at the crosswind response mode initiation point includes a case where the host vehicle is positioned in front of the crosswind response mode initiation point and a case where the host vehicle already passed through the crosswind response mode initiation point.

In Step S140, the EPS map selection unit 104 determines whether crosswind response mode execution is in progress. Crosswind response mode execution being in progress means that the host vehicle already passed through the crosswind response mode initiation point, and crosswind response mode execution not being in progress means that the host vehicle is yet to arrive at the crosswind response mode initiation point.

The EPS map selection unit 104 returns to Step S120 in a case where the EPS map selection unit 104 determines in Step S140 that crosswind response mode execution is not in progress. The EPS map selection unit 104 proceeds to Step S150 in a case where the EPS map selection unit 104 determines in Step S140 that crosswind response mode execution is in progress.

In Step S150, the EPS map selection unit 104 executes crosswind response mode termination point decision processing to decide on a point where crosswind response mode execution in progress is terminated. In the crosswind response mode termination point decision processing, the EPS map selection unit 104 sets, as a crosswind response mode termination point, the closest place where the host vehicle is not affected by disturbance attributable to crosswind anymore after passing through the crosswind point except for a section where disturbance attributable to crosswind is likely to continue.

Methods for determining whether the host vehicle is not affected by disturbance attributable to crosswind anymore are not particularly limited. For instance, the EPS map selection unit 104 determines that the host vehicle is subjected to disturbance attributable to crosswind in a case where the deviation between the steering angle of the steering device and the traveling direction of the host vehicle recognized by the external environment recognition device 10, the yaw rate sensor, or the like is equal to or greater than a predetermined value.

The EPS map selection unit 104 recognizes the section where disturbance attributable to crosswind is likely to continue based on the map information. For instance, the EPS map selection unit 104 recognizes a bridge- or overpass-shaped section, a section where a plurality of tunnels follow one after another within a predetermined distance, a section where building valleys follow one after another within a predetermined distance, or the like as the section where disturbance attributable to crosswind is likely to continue.

Next, in Step S160, the EPS map selection unit 104 determines whether the host vehicle is at the crosswind response mode termination point. In Step S170, the EPS map selection unit 104 determines that the host vehicle is at the crosswind response mode termination point in a case where the host vehicle is positioned within a predetermined distance from the crosswind response mode termination point.

The EPS map selection unit 104 returns to Step S150 in a case where the EPS map selection unit 104 determines in Step S160 that the host vehicle is not at the crosswind response mode termination point.

The EPS map selection unit 104 proceeds to Step S170 and executes crosswind response mode termination processing in a case where the EPS map selection unit 104 determines in Step S160 that the host vehicle is at the crosswind response mode termination point.

In the crosswind response mode termination processing, the EPS map selection unit 104 changes the shape of the assist force generation map for deciding on an assist force generated in the electric actuator 71b of the electric power steering device 71 from that selected in Step S110 to the normal assist map N. Here, the EPS map selection unit 104 changes the shape of the assist force generation map gradually and in a plurality of divided stages such that the shape of the assist force generation map is smoothly changed.

For instance, in a case where the shape of the assist force generation map is changed from the high assist map H2 to the normal assist map N by the crosswind response mode being terminated in Step S170, the assist force generated in the electric power steering device 71 with respect to a certain steering force value is gradually weakened along a clothoid curve with time.

By the shape of the assist force generation map being smoothly changed as described above, discomfort given to the driver as a result of a change in the shape of the assist force generation map can be suppressed or prevented.

After Step S170 is executed, the EPS map selection unit 104 terminates the map selection processing and executes the map selection processing anew.

Figure 5:
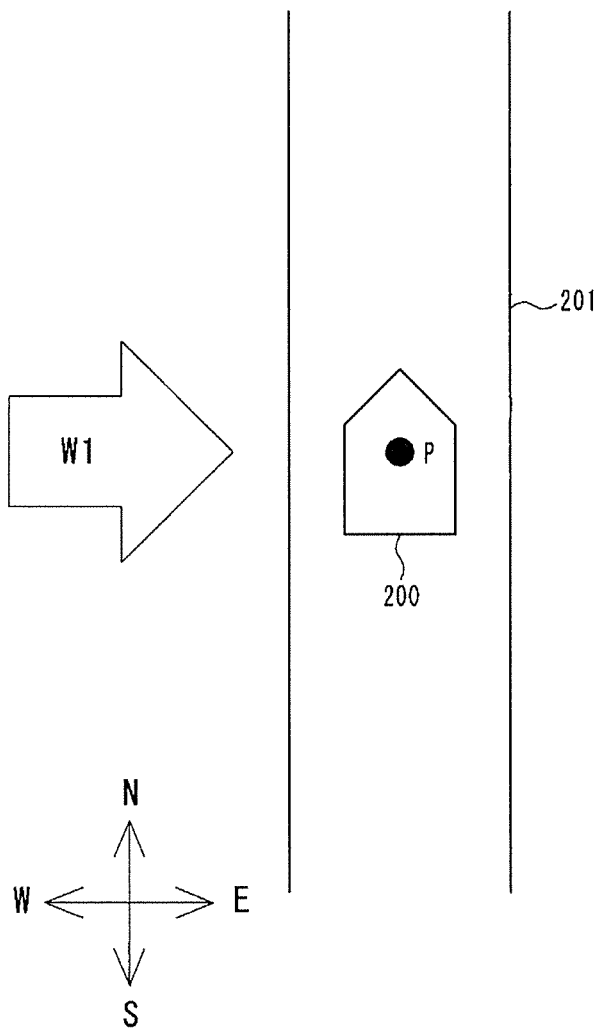
FIG. 5 is a diagram illustrating a state where crosswind blows from the left during traveling of a host vehicle on a straight road.

Control by the traveling control system 1 configured as described above will be described below. Illustrated in FIG. 5 is a state where the shape of a road 201 at a crosswind point P is straight and a host vehicle 200 is at the crosswind point P. In the example that is illustrated in FIG. 5, the road 201 is linear in the south-north direction and the host vehicle 200 travels to the north. In addition, crosswind W1 blows from the west toward the east.

Figure 6:
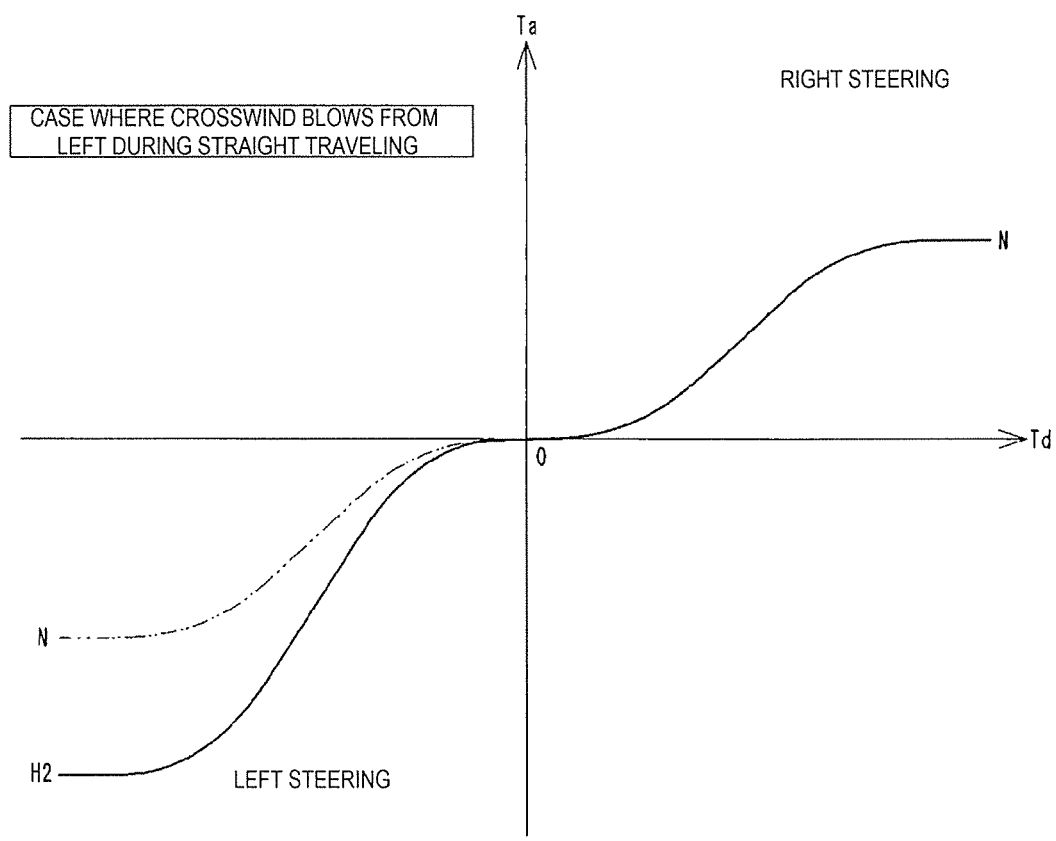
FIG. 6 is a diagram illustrating the assist force generation map selected by the EPS map selection unit in the case that is illustrated in FIG. 5.

As illustrated in FIG. 6, in the state illustrated in FIG. 5, the EPS map selection unit 104 selects the high assist map H2 with regard to left steering of the electric power steering device 71 and selects the normal assist map N with regard to right steering of the electric power steering device 71 (Step S240). In the left steering region in FIG. 6, the normal assist map N is indicated by a two-dot chain line for comparative reference.

In other words, in the traveling control system 1 according to the present example, the electric power steering device 71 generates an assist force stronger than during normal traveling in a case where steering is performed in the direction against the force of the crosswind W1 pushing the host vehicle 200 (case of left steering) during traveling on the straight road where the crosswind W1 blows as illustrated in FIG. 5. In addition, in the case that is illustrated in FIG. 5, the electric power steering device 71 of the traveling control system 1 according to the present example maintains the same assist force as during normal traveling in a case where steering is performed in the direction along the force of the crosswind W1 pushing the host vehicle 200 (case of right steering). Accordingly, with the traveling control system 1 according to the present example, the driver's steering force for maintaining straight host vehicle traveling in the crosswind W1 can be reduced and the driver's fatigue can be reduced.

Figure 7:
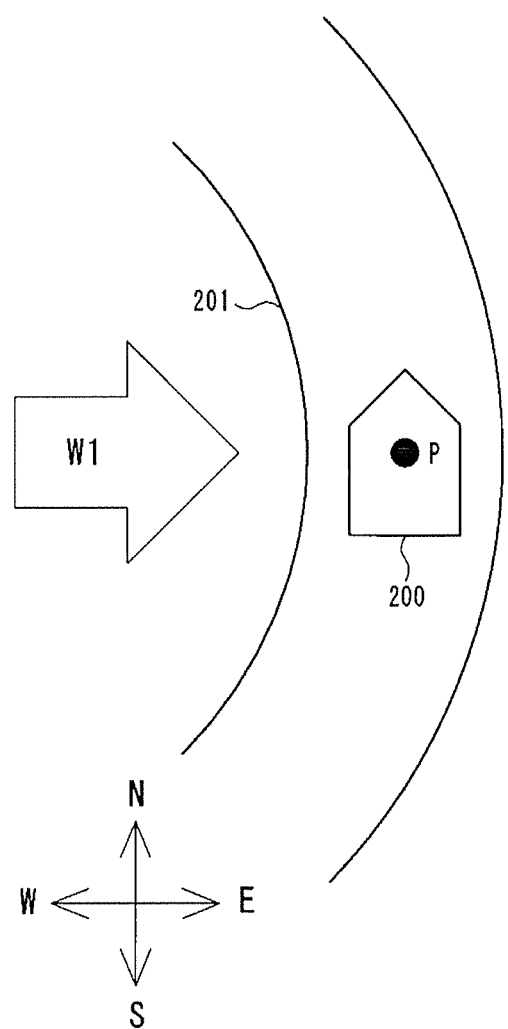
FIG. 7 is a diagram illustrating a state where crosswind blows from the left during traveling of the host vehicle on a road curved to the left.

Illustrated in FIG. 7 is a state where the road 201 at the crosswind point P is curved upwind with the host vehicle 200 at the crosswind point P. In the example that is illustrated in FIG. 7, the road 201 is curved to the west when seen from the position of the host vehicle 200 heading to the north and the crosswind W1 blows from the west toward the east.

Figure 8:
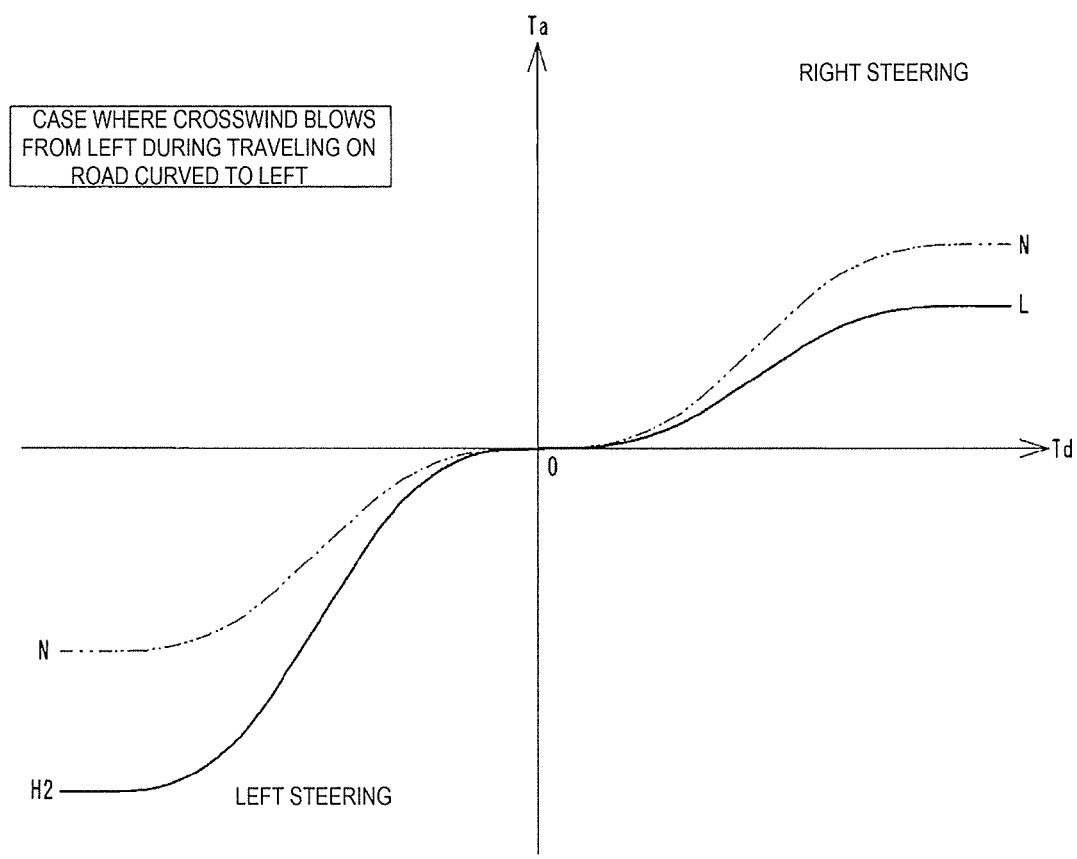
FIG. 8 is a diagram illustrating the assist force generation map selected by the EPS map selection unit in the case that is illustrated in FIG. 7.

As illustrated in FIG. 8, in the state illustrated in FIG. 7, the EPS map selection unit 104 selects the high assist map H2 with regard to left steering of the electric power steering device 71 and selects the low assist map L with regard to right steering of the electric power steering device 71 (Step S310). In FIG. 8, the normal assist map N is indicated by a two-dot chain line for comparative reference.

In other words, in the traveling control system 1 according to the present example, the electric power steering device 71 generates an assist force stronger than during normal traveling in a case where steering is performed in the direction against the force of the crosswind W1 pushing the host vehicle 200 (case of left steering) during traveling on the road curved upwind (to the left) with the crosswind W1 blowing from the left of the host vehicle as illustrated in FIG. 7. In addition, in the case that is illustrated in FIG. 7, the electric power steering device 71 of the traveling control system 1 according to the present example generates an assist force weaker than during normal traveling in a case where steering is performed in the direction along the force of the crosswind W1 pushing the host vehicle 200 (case of right steering). Accordingly, with the traveling control system 1 according to the present example, the driver's steering force for traveling of the host vehicle 200 along the curved road and against the force of the crosswind W1 pushing the host vehicle 200 can be reduced and the driver's fatigue can be reduced.

In general, in the case illustrated in FIG. 7, the force of the crosswind W1 pushing the host vehicle 200 to the outside of the curved road and the self-aligning torque of the host vehicle 200 are combined with each other, and thus the response of the host vehicle 200 to the steering force causing the host vehicle 200 to head to the outside of the curved road becomes hypersensitive, and then the driver is unlikely to be able to perform a course maintaining operation with ease. With the traveling control system 1 according to the present example, however, the assist force of steering causing the host vehicle 200 to head to the outside of the curved road in accordance with the force of the crosswind W1 is weakened, and thus the response of the host vehicle 200 to steering heading to the outside of the curved road can be blunted, the driver's course maintaining operation can be facilitated, and the driver's fatigue can be reduced.

Figure 9:
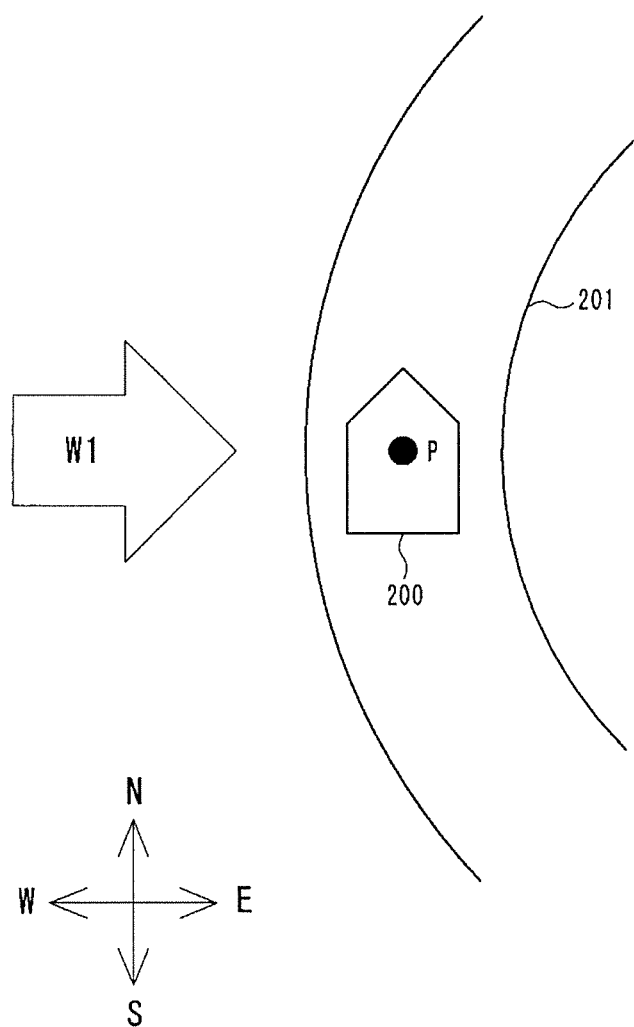
FIG. 9 is a diagram illustrating a state where crosswind blows from the left during traveling of the host vehicle on a road curved to the right.

Illustrated in FIG. 9 is a state where the road 201 at the crosswind point P is curved downwind with the host vehicle 200 at the crosswind point P. In the example that is illustrated in FIG. 9, the road 201 is curved to the east when seen from the position of the host vehicle 200 heading to the north and the crosswind W1 blows from the west toward the east.

Figure 10:
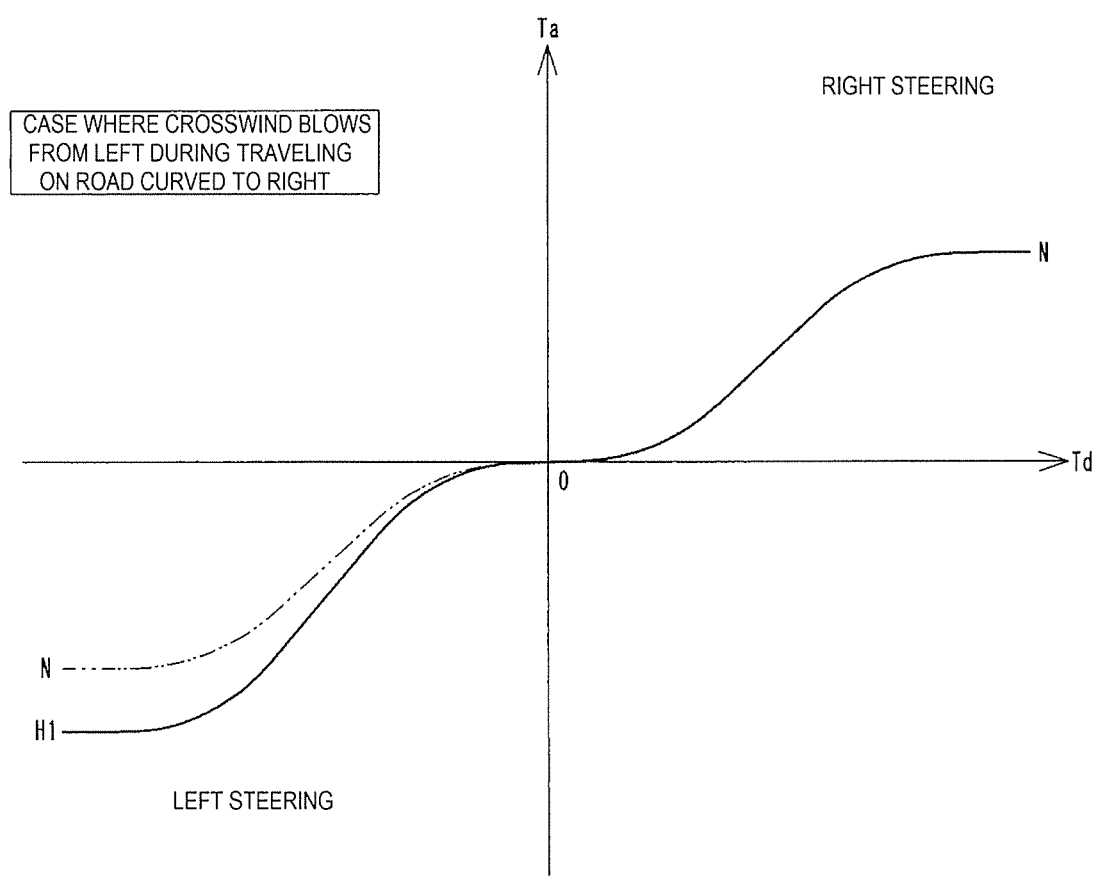
FIG. 10 is a diagram illustrating the assist force generation map selected by the EPS map selection unit in the case that is illustrated in FIG. 9.

As illustrated in FIG. 10, in the state illustrated in FIG. 9, the EPS map selection unit 104 selects the medium assist map H1 with regard to left steering of the electric power steering device 71 and selects the normal assist map N with regard to right steering of the electric power steering device 71 (Step S330). In FIG. 10, the normal assist map N is indicated by a two-dot chain line for comparative reference.

In other words, in the traveling control system 1 according to the present example, the electric power steering device 71 generates an assist force somewhat stronger than during normal traveling in a case where steering is performed in the direction against the force of the crosswind W1 pushing the host vehicle 200 (case of left steering) during traveling on the road curved downwind (to the right) with the crosswind W1 blowing from the left of the host vehicle as illustrated in FIG. 9. In addition, in the case that is illustrated in FIG. 9, the electric power steering device 71 of the traveling control system 1 according to the present example generates an assist force similar to that during normal traveling in a case where steering is performed in the direction along the force of the crosswind W1 pushing the host vehicle 200 (case of right steering).

In the event of left steering during a right turn as illustrated in FIG. 9, the self-aligning torque of the host vehicle 200 leads to an effect similar to that of an assist force, and thus the assist force generated during windward steering is weaker than in the other case. Also in the case illustrated in FIG. 9, with the traveling control system 1 according to the present example, the driver's steering force for traveling of the host vehicle 200 along the curved road and against the force of the crosswind W1 pushing the host vehicle 200 can be reduced and the driver's fatigue can be reduced.

As described above, the traveling control system 1 according to the present example is provided with the EPS map selection unit 104 changing the assist force generation map of the electric power steering device 71 such that the assist force that the electric power steering device 71 generates with respect to windward steering becomes stronger than the assist force that the electric power steering device 71 generates with respect to leeward steering during traveling of the host vehicle 200 through the crosswind point P. As described above, with the traveling control system 1 according to the present example, the driver's steering force during steering for maintaining the course of the host vehicle 200 against crosswind can be reduced and the driver's fatigue can be reduced.

The present invention is not limited to the example described above and can be appropriately changed within the scope of the summary or idea of the invention read from the claims and the specification as a whole. Any vehicle traveling control system following such change is included in the technical scope of the present invention.

The invention claimed is:

1. A vehicle traveling control system comprising:
a communication device configured to receive wind information including information on a wind direction and a detection position of crosswind detected along a road to be traveled by a host vehicle, the wind direction of the crosswind crossing a traveling direction of the host vehicle;
an electric power steering device that generates an assist force applied to a steering wheel of the host vehicle; and
a control unit configured to:
  detect, using a positioning device, a current position of the host vehicle;
    determine that the host vehicle is traveling through the detection position of the crosswind based on the detected current position of the host vehicle; and
  while the host vehicle travels through the detection position of the crosswind:
    when a road shape of the road at the detection position of crosswind is straight, control the electric power steering device to apply 1) a first assist force to the steering wheel of the host vehicle when the steering wheel of the host vehicle is steered toward an upstream of the crosswind and 2) a second assist force to the steering wheel of the host vehicle when the steering wheel of the host vehicle is steered toward a downstream of the crosswind, the first assist force being larger than the second assist force;
    when the road shape of the road at the detection position of crosswind is curved toward the downstream of the crosswind, control the electric power steering device to apply 1) a third assist force to the steering wheel of the host vehicle when the steering wheel of the host vehicle is being steered toward the upstream of the crosswind and 2) the second assist force to the steering wheel of the host vehicle when the steering wheel of the host vehicle is being steered toward a downstream of the crosswind, the third assist force being smaller than the first assist force and larger than the second assist force; and
    when the road shape of the road at the detection position of crosswind is curved toward the upstream of the crosswind, control the electric power steering device to apply 1) the first assist force to the steering wheel of the host vehicle when the steering wheel of the host vehicle is being steered toward the upstream of the crosswind and 2) a fourth assist force to the steering wheel of the host vehicle when the steering wheel of the host vehicle is being steered toward a downstream of the crosswind, the fourth assist force being smaller than the second assist force.

* * * * *